(12) United States Patent
Kowalick

(10) Patent No.: US 9,165,131 B1
(45) Date of Patent: Oct. 20, 2015

(54) VEHICLE CONNECTOR LOCKOUT FOR IN-VEHICLE DIAGNOSTIC LINK CONNECTOR (DLC) INTERFACE PORT

(76) Inventor: Thomas M. Kowalick, Southern Pines, NC (US)

( * ) Notice: Subject to any disclaimer, the term of this patent is extended or adjusted under 35 U.S.C. 154(b) by 352 days.

(21) Appl. No.: 13/555,078

(22) Filed: Jul. 20, 2012

Related U.S. Application Data

(60) Provisional application No. 61/510,035, filed on Jul. 20, 2011.

(51) Int. Cl.
*G06F 21/50* (2013.01)
*G06F 21/34* (2013.01)
*G06F 21/62* (2013.01)
*G06F 21/44* (2013.01)

(52) U.S. Cl.
CPC ............... *G06F 21/34* (2013.01); *G06F 21/62* (2013.01); *G06F 21/44* (2013.01)

(58) Field of Classification Search
CPC .......... G06F 21/34; G06F 21/62; G06F 21/44
USPC .......................................................... 710/15
See application file for complete search history.

(56) References Cited

U.S. PATENT DOCUMENTS

| | | | |
|---|---|---|---|
| 2008/0214022 A1* | 9/2008 | Kowalick | 439/34 |
| 2009/0048916 A1* | 2/2009 | Nuzum et al. | 705/14 |
| 2009/0193500 A1* | 7/2009 | Griffin et al. | 726/2 |
| 2009/0289109 A1* | 11/2009 | Sims et al. | 235/380 |

* cited by examiner

*Primary Examiner* — Henry Tsai
*Assistant Examiner* — John Roche
(74) *Attorney, Agent, or Firm* — Whitham, Curtis, Christofferson & Cook, P.C.

(57) ABSTRACT

A vehicle connector lockout prevents tampering with digital data stored on a vehicle's Controlled Area Network (CAN), that is accessed via the in-vehicle Diagnostic Link Connector (DLC) interface port, by verifying in pre-crash, crash and post-crash real time when the DLC is secure and un-secure using Near Frequency Communications (NFC) technologies embedded in the vehicle connector lockout that is capable of communicating with the Internet. In one implementation, when a specific area of the vehicle connector lockout is touched by an NFC enabled cell device the time, date and NFC UIP number is recorded in the NFC cell application URL landing page and saved to a Cloud vault. In another implementation, when the vehicle connector lockout key is touched by an NFC enabled cell device the user confirms in real-time the lockout sealed/unsealed status of the DLC thus establishing chain of custody.

8 Claims, 4 Drawing Sheets

Controlled Area Network (CAN) (2)

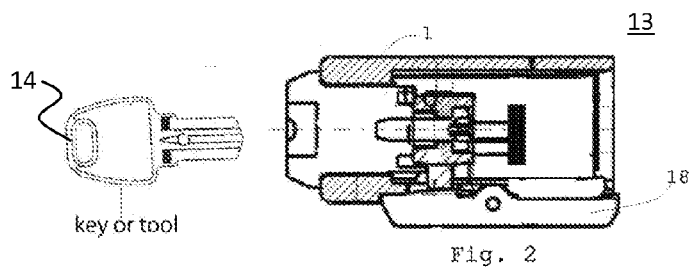
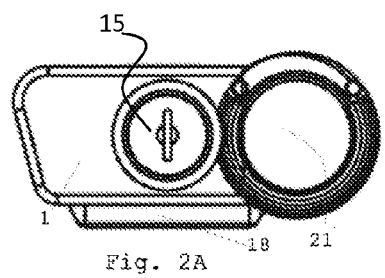
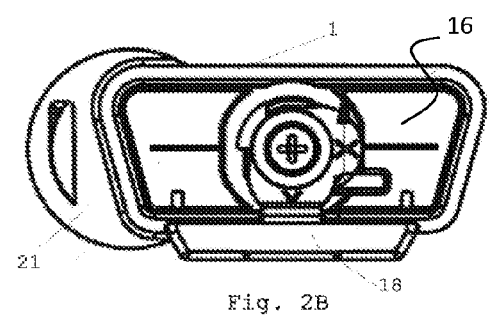
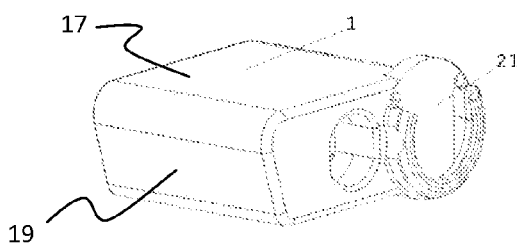
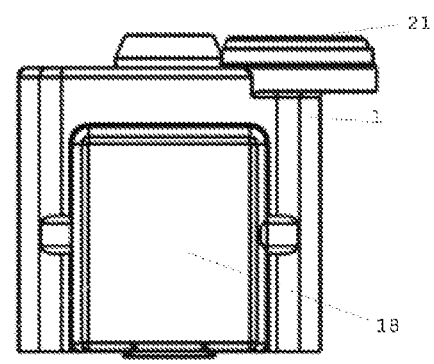
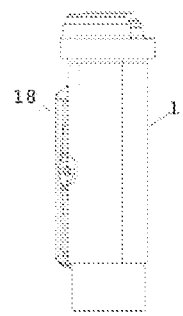
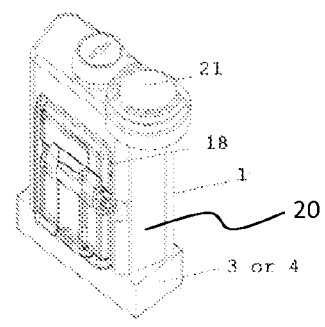

NFC INLAY (24)    Memory Chip (22)    NFC Token / Tag (23)

Controlled Area Network (CAN) (2)

VEHICLE CONNECTOR LOCKOUT FOR IN-VEHICLE DIAGNOSTIC LINK CONNECTOR (DLC) INTERFACE PORT

RELATED APPLICATION

This application claims priority from U.S. Provisional Application Ser. No. 61/510,035 titled "VEHICLE CONNECTOR LOCKOUT SEAL FOR IN-VEHICLE DIAGNOSTIC LINK CONNECTOR (DLC) INTERFACE PORT" and filed on Jul. 20, 2011, the contents of which are incorporated by reference herein.

BACKGROUND OF THE INVENTION

1. Field of the Invention

The present invention relates to a vehicle connector lockout for an in-vehicle onboard Diagnostic Link Connector (DLC) computer interface port, and more specifically to enhancing a vehicle connector lockout with embedded Near Frequency Communication (NFC) technologies which can communicate with the Internet via a mobile cell application.

2. Description of Related Art

Technology allowing vehicle safety researchers to collect objective data on crashes would open the door to a new generation of understanding. The opportunities are immense since about 20,000 tow-away crashes occur each day. The past four decades have witnessed an exponential increase in the number and sophistication of electronic systems in vehicles. A vast increase in automotive electronic systems, coupled with related memory storage technologies, has created an array of new safety engineering opportunities and subsequent consumer acceptance challenges.

Virtually every passenger car and light truck manufactured in or imported to the North American market since model year 1996 includes an Environmental Protection Agency (EPA) mandated Diagnostic Link Connector (DLC) to allow access to engine and emissions diagnostic data. SAE J1962 was originally developed to meet U.S. OBD requirements for 1996 and later model year vehicles. ISO 15031-3 was based on SAE J1962 and was intended to meet European OBD requirements for 2000 and later model year vehicles, and added a modified connector type to accommodate vehicles with a 24 V system. This document is technically equivalent to ISO 15031-3 with U.S. specific requirements identified. The ISO 15031-3 document is intended to satisfy the OBD requirements in countries other than the U.S., and includes functionality not required or not allowed in the U.S. This onboard DLC (OBDII) is regulated by the Code of Federal Regulations (CFR) (40 CFR 86.094-17(h)) and revisions for subsequent model years. It is standardized by the Society of Automotive Engineers (SAE) Vehicle Electrical Engineering Systems Diagnostic Standards Committee.

The physical configuration of the output plug is specified under SAE J1962-2002 and through the International Standards Organization under ISO 15031-3:2004 and is increasingly used as an access point to other in-vehicle electronics systems, subsystems, computers, sensors, actuators and an array of control modules including the air bag control module. The onboard DLC is also used as a serial port to retrieve data elements from on-board systems, subsystems, modules, devices and functions that collect and store data elements related to a vehicle crash such as a restraint control module (RCM) and event data recorder (EDR).

Thus, the onboard DLC provides a portal for capture of an increasing volume of sophisticated sensor data regarding the operating condition, operation and behavior of vehicles, and in particular the operation and behavior of vehicles involved in crashes. Consumers continue to be interested in safety advancements but remain concerned about issues of privacy, tampering, and misuse of vehicle crash data. It is important to protect a variety of crash-sensing and diagnostic memory modules. Increasingly, data from these devices have been used in civil and criminal court cases nationwide, including cases dealing with vehicular homicide in which speed was an issue.

Many light-duty vehicles, and increasing numbers of heavy commercial vehicles, are equipped with some form of Motor Vehicle Event Data Recorder (MVEDR) These systems, which are designed and produced by individual motor vehicle manufacturers and component suppliers, are diverse in function and proprietary in nature, however, the SAE J1962 (ISO 15031-3:2004) vehicle DLC has a common design and pinout, and is thus universally used to access event data recorder information.

Data access via the DLC can be accomplished by using scan tools or microcomputers and network interfaces. This same DLC and network interface is also used for re-calibrating electronic control units (ECU) on a vehicle. Such ECU applications can include restraint controls, engine controls, stability controls, braking controls, etc. It is important to protect against misuse of electronic tools which use the DLC to erase, modify or tamper with electronic controller or odometer readings, or to improperly download data.

Utilizing a vehicle connector lockout provides an opportunity to achieve DLC security to prevent vehicle tampering, which can include odometer fraud, illegal calibrations leading to emissions violations and theft of personal data. The data will be more secure and credible while still permitting accessibility to legitimate end users.

Having standardized data definitions and formats allows the capture of vehicle crash information. The value of improved crash information is in improving the knowledge of what happens before, during, and after a motor vehicle crash. Such insights will provide major benefits to society and significantly improve the science of motor vehicle crashes.

Kowalick in U.S. Pat. No. 7,553,173 teaches a vehicle connector lockout apparatus capable of being connected to the diagnostic port of a vehicle. The preferred embodiment of the invention uses a raised protrusion, located in the common space below the two rows of pin spacing of the diagnostic port, as a locking point. The preferred embodiment provides a blocking mating connector with a pressure mechanism for clamping the mating connector to the protrusion. In the preferred embodiment the pressure mechanism is activated and released mechanically by operation of a key or tool in a lock which is an integral part of the mating connector, where rotation of the key or tool to the locked position in the lock applies pressure to the protrusion so as to clamp the blocking mating connector to the protrusion. A further embodiment of the invention provides a non-volatile microchip memory component to store information about the vehicle operator usable by medical personnel at the scene of a crash. However, Kowalick does not teach a means of determining in pre-crash, crash, or post-crash real-time if and when the device is attached or unattached.

Doyle in U.S. Pat. No. 6,795,751 teaches a secure event data recording system configured for use in a passenger vehicle. The secure event data recording system can include an event data recorder; a memory device coupled to the event data recorder and configured to store event data processed in the event data recorder, and, an input/output port communicatively linked to the memory device through which read/write access can be provided to the memory device. Significantly, a tamper proof sealing mechanism can be provided which bars access to the memory device, the event data recorder and the input/output port without causing an irreparable breach of the tamper proof sealing mechanism. However, Doyle does not teach any locking mechanism or any means to determine in pre-crash, crash, or post-crash real time if and when the device is attached or unattached.

SUMMARY OF THE INVENTION

The main objective of the invention is to provide a vehicle connector lockout to prevent tampering or altering of digital data stored on an in-vehicle electronic vehicle network utilizing a diagnostic link connector (DLC) interface port with embedded Near Field Communication (NFC) technologies. NFC is a set of standards for smart-phones and similar devices to establish radio communications with each other by touching them together or bringing them into close proximity. Use of embedded NFC technologies in the DLC therefore enhances the security, integrity and authenticity of the data.

The invention provides a vehicle connector lockout to prevent tampering or altering of digital data stored on a vehicle's Controlled Area Network (CAN). The CAN is accessible via the in-vehicle Diagnostic Link Connector (DLC) interface port. The vehicle connector lockout thereby enhances the security, integrity and authenticity of the data. Specifically, the invention operates by enabling verification in pre-crash, crash and post-crash real time whether the DLC is secure or un-secure using Near Frequency Communications (NFC) technologies embedded in the vehicle connector lockout. The embedded NFC device can be used in communicating with the Internet, which enables transmission and storage of verification data to an Internet site.

One application of the vehicle connector lockout includes utilizing embedded Near Field Communications (NFC) technologies combined with a mobile cell phone app that communicates with the Internet. When a specific area of the vehicle connector lockout is "touched" (as defined by NFC standards) by an NFC enabled cell device the time, date and NFC UIP number is recorded in the NFC cell application URL landing page and saved to a Cloud vault. The user also enters the Vehicle Identification Number (VIN), the vehicle license number and state, and the key code of the lock. Subsequently, when the vehicle connector lockout key is touched by an NFC enabled cell device the user confirms in real-time the lockout sealed/unsealed status of the DLC thus establishing chain of custody essential to enhancing probative value of the digital data. Prior to unlocking the user reserves the NFC touch/tag process by touching the key first, then unlocking the vehicle connector lockout, and finally touching the tag embedded in the lock. A secure data log is thereby created and is then available for post-crash analysis.

In just a few minutes online (Google, look at "automotive hacking" for example) one can locate products and services to roll back digital odometers and erase crash data by accessing the in-vehicle diagnostic link connector (DLC). A variety of electronic tools are manufactured and marketed to re-engineer in-vehicle networks, reset odometers and tamper or erase vehicle data via this port which is generally unsecure and prone to misuse of the original safety and emissions diagnostic related purpose. Unauthorized access, whether malicious or inadvertent, must be prevented in order to protect the integrity of connected devices, vehicles, and systems.

In a recently published, peer-reviewed, research paper (Experimental Security Analysis of a Modern Automobile 2010 IEEE Symposium on Security and Privacy) computer security experts at the University of Washington and the University of California, San Diego, concluded that hackers who access a car's computers "can leverage this ability to completely circumvent a broad array of safety-critical systems . . . including disabling the brakes, selectively braking individual wheels on demand, stopping the engine, and so on." It also was determined that infiltrators could conceivably hide any trace of their hacking and "completely erase any evidence of its presence after a crash."

Tampering

Tampering involves the deliberate altering or adulteration of information, a product, or system. Tampering means to modify, remove, render inoperative, and cause to be removed, or make less operative any device or element design installed on a motor vehicle or motor vehicle power-train, chassis or body components which results in altering federal motor vehicle safety standards (FMVSS). Tamper-evident describes a device or process that makes unauthorized access to the protected object easily detected or determined after the fact. Tamper resistance is resistance to tampering by either the normal users of a product, or system by others with physical access to it. A variety of electronic tools are manufactured and marketed to re-engineer in-vehicle networks, reset odometers and tamper or erase vehicle data via this port which is generally unsecure and prone to misuse of the original safety and emissions diagnostic related purpose. Unauthorized access, whether malicious or inadvertent, must be prevented in order to protect the integrity of connected devices, vehicles, and systems.

Tampering Tools

There are a number of tools, publicly advertised on the Internet, that have the ability to clear "locked data" from crash records in Event Data Recorders (typically SRS ECUs):

The NHTSA's National Center for Statistics and Analysis Research Note DOT HS 811 363 cites that there were 5,505,000 vehicle crashes in 2009. The major technical problem is that all of these 2009 vehicles crashed with un-lockout unsealed in-vehicle networks, although not all of these vehicles included an event data recorder function or device whereby post-crash data could be analyzed. However, as the nation's vehicle fleet is updated more and more vehicles include electronic systems or sub-systems and the DLC will remain the primary communications and download port to the majority of electrical and electronic data accessible via the Controlled Area Network (CAN) infrastructure.

The exact technical problem is locking down this port to avoid mischief and misuse including tampering. Since the DLC is easily located and clearly visible to first responders such as law enforcement, emergency medical technicians and others it can be easily established if the port was lockout sealed or unsealed by taking a photograph that includes time and date. Many cell phones include photo capability. Otherwise, a law enforcement official may note on an accident report if the DLC was lockout sealed.

Once this fact is established, despite the best efforts of everyone involved, it may be possible that a hacker could defeat the locking mechanism by numerous methods ranging from blunt physical force to ripping out the entire wiring assembly and thereby removing the evidence that the port was lockout sealed.

However, this is not a simple or quick process for a number of reasons. First, the DLC is usually tightly fitted amongst a number of other devices within the vehicle cabin whereby the attacker could not get to the side or the rear of the DLC where the NFC tag is embedded. Second, the wiring harness is very tightly packaged and concealed and would require extreme blunt force to detach by physical force since there are a large number of wires (up to 16) that retain the DLC.

The major point of the process is to provide evidence at the time of the crash. Thus, establishing a chain of custody at crash time is essential to securing digital data probative value.

A National Research Council (NRC) of the National Academies of Sciences (NAS) Transportation Research Board (TRB) Special Report 308: *The Safety Challenge and Promise of Automotive Electronics* [ISBN 978-0-309-22304-1] noted the following key points which directly justify the rationale for to the vehicle connector lockout described in this disclosure.

1. Electronics systems have become critical to the functioning of the modern automobile. Enabled by advances in sensors, microprocessors, software, and networking capabilities, these systems are providing a rich and expanding array of vehicle features and applications for comfort, convenience, efficiency, operating performance, and safety. Almost all functions in today's automobile are mediated by computer-based electronics systems. Some of these systems have improved on capabilities once provided by mechanical, electromechanical, and hydraulic systems. In many other cases, electronics systems are enabling the introduction of new capabilities, including a growing number of applications intended to assist the driver in avoiding and surviving crashes.

2. Electronics systems are being interconnected with one another and with devices and networks external to the vehicle to provide their desired functions. System interconnectivity and complexity are destined to grow as the capabilities and performance of electronics hardware, software, and networking continue to expand along with consumer demands for the benefits these interconnected systems confer. Networked electronics systems and software will continue to be the foundation for much of the innovation in automobiles and may lead to fundamental changes in how the responsibilities for driving tasks and vehicle control are shared among the driver, the vehicle, and the infrastructure.

3. Proliferating and increasingly interconnected electronics systems are creating opportunities to improve vehicle safety and reliability as well as demands for addressing new system safety and cybersecurity risks. As systems share sensors and exchange data to expand functionality, an emerging safety assurance challenge is to prevent (a) the unintended coupling of systems that can lead to incorrect information being shared and (b) unauthorized access to or modifications of vehicle control systems, both of which could lead to unintended and unsafe vehicle behaviors. A critical aspect of this challenge is to ensure that the complex software programs managing and integrating these electronics systems perform as expected and avoid unsafe interactions. Another is to ensure that the electronics hardware being embedded throughout the vehicle is compatible with the demanding automotive operating environment, including the electromagnetic environment, which may be changing as electronics devices and accessories are added to automobiles. Inasmuch as many problems in software and electromagnetic interference may leave no physical trace behind, detection and diagnosis of them can be more difficult.

4. By enabling the introduction of many new vehicle capabilities and changes in familiar driver interlaces, electronics systems are presenting new human factors challenges for system design and vehicle-level integration. Although automotive manufacturers spend much time and effort in designing and testing their systems with users in mind, the creation of new vehicle capabilities may lead to responses by drivers that are not predicted and that may not become evident until a system is in widespread use. Drivers unfamiliar with the new system capabilities and interfaces may respond to or use them in unexpected and potentially unsafe ways. Thus, human factors expertise, which has always been important in vehicle design and development, is likely to become even more so in designing electronics systems that perform and are used safely.

5. Electronics technology is enabling nearly all vehicles to be equipped with EDRs that store information on collision-related parameters as well as enabling other embedded systems that monitor the status of safety-critical electronics, identify and diagnose abnormalities and defects, and activate predefined corrective responses when a hazardous condition is detected. Access to data logged in EDRs can aid crash investigators, while diagnostics systems can facilitate vehicle repair and servicing and inform automotive manufacturers about possible system design, engineering, and production issues. Continued advances in electronics technology and their proliferation in vehicles can be expected both to necessitate and to enable more applications for monitoring state of health, performing self-diagnostics, implementing failsafe strategies, and logging critical data in the event of crashes and unusual system and vehicle behaviors.

Event Data Recorder (EDR) Generic Risks
Confidentiality
Integrity
Availability
Authenticity
Confidentiality CONFIDENTIALITY is defined as the "property of data that indicates the extent to which these data have not been made available or disclosed to unauthorized individuals, processes, or other entities" ([ISO/IEC 2382-8: 1998], 08.01.09). The assumption that EDRs only provide data linked to a specific vehicle, but not a specific driver, ignores the data privacy issues outside the vehicle. Although it may seem feasible to avoid privacy issues by restricting the recorded data to a minimal set of sensor and status data and to only record a time span of about one minute around the crash event—it is highly probable that next generation memory module technologies will increase the recording time, therefore making privacy issues unavoidable. Increasing numbers of people will obtain access to EDR data. The minimum requirement to access EDR data is physical access to the vehicle's interior and the SAE J1962 connector. Therefore, access to EDR data will always be possible unless a technical countermeasure is utilized. The driver and owner will always have physical access to the EDR device (via the SAE J1962 DLC common on all light vehicles). This is a problem if the owner can access data that would indicate a crash in which the vehicle was involved and where a driver other than the owner was involved in the crash. For example, a car rental company or transport fleet could regularly access data to find out about the crashes by drivers. Even if the rental company does not sue the driver immediately, the company (or even a group of cooperating rental companies) could use the data to keep a 'black list' of drivers involved in crashes. Since the USDOT/NHTSA is mandating EDRs in light vehicles it is highly likely that lease, fleet and rental vehicles will have EDRs. Therefore, since drivers are supposed to notify the company about any crash, accessing the EDR data would only change the situation for those drivers who had not informed the company about the crash. Although this might be an issue in the case of low-priority (unreported to law enforcement) crashes, access to the data by the owner in this scenario, especially the combination of EDR data and personal data requires the consent of the driver and would need to be explicitly agreed in the rental contract. The combination of EDR data with driving records creates data records that require consumer data protection to avoid creating 'black lists'. The potential to 'misuse' EDR data will greatly increase. Following a crash, many vehicles are taken to a workshop where access to the EDR data is possible. Workshops can sell data to car or insurance companies for statistical purposes, or sell data for marketing purposes. A rare/extreme motivation for workshops to download EDR data is blackmailing of drivers or owners which is more likely to occur with high-profile crashes. After a crash, it may be possible that neither driver nor owner is capable of controlling physical access to the vehicle. Therefore, an opportunity does exist for third parties to access EDR data from the vehicle, although they may have no rights to access them. It is technically possible to gather EDR evidence since the port is unprotected.

Integrity

INTEGRITY is defined as the "property of data whose accuracy and consistency are preserved regardless of changes made" (data integrity, [ISO/IEC 2382-8:1998], 08.01.07). For systems (like the EDR itself), integrity means "the quality of a data processing system fulfilling its operational purpose while both preventing unauthorized users from making modifications to or use of resources and preventing authorized users from making improper modifications to or improper use of resources" (system integrity, [ISO/IEC 2382-8: 1998], 08.01.17). The most obvious threat to an EDR is the manipulation of the data. After a crash, a driver or owner of a vehicle may be interested to tamper EDR data in order to avoid prosecution. Manipulation/Tampering may take several forms, like replacing all data with a forged set of records, changing only selected records, or even changing only selected entries within a record. From an IT security point of view, all manipulations/tampering of data is considered as unauthorized—however, it still happens.

An attacker may delete data from the EDRs event storage creating the impression that the crash did not happen at all. An attacker may overwrite incriminating data in a way that suggests that the EDR or its attached sensors did not function correctly, thus making the EDR data useless for prosecution. An attacker may consistently change EDR records in a way that suggests that the accident did happen, but the driver did not violate any driving regulations. For example, an attacker can change the vehicle speed prior to a crash to a lower value, indicating that the vehicle was being driven within the permitted speed limit. Such manipulations are the most complex ones, because not only the speed needs to be changed, but also the acceleration/deceleration values, time values, and other data need to be changed consistently. Forging/Tampering/Manipulation is most likely following a crash, unless an attacker has exact knowledge of a pending crash and seeks to influence the post-crash analysis of that crash data. Therefore, most manipulation of data will occur following a crash before it has been downloaded (and secured as evidence) by an authorized party.

Once the EDR data has been secured as evidence by time stamping and digitally signing the downloaded records, manipulation will be useless, since any record presented in court would have to compete with credibility with the original record already downloaded and introduced into the legal process by the appointed trustworthy expert. Therefore, we can assume that manipulation of EDR data is only a threat during the 'window of opportunity' between the crash itself and the point in time where the EDR is secured as evidence. In Hit & Run cases the 'window of opportunity' is larger. There is also a threat of manipulating data prior to selling the vehicle. With a USDOT/NHTSA EDR mandate a large base of installed EDRS (90+ million) will trigger development of sophisticated manipulation tools, especially if such a manipulation can be programmed in software. Electronic tools exist to manipulate EDRs and to alter digital odometers.

Availability

AVAILABILITY is defined as the "property of data or of resources being accessible and usable on demand by an authorized entity" ([ISO/IEC 2382-8:1998], 08.01.17). Threats to EDR data are similar to the integrity threats because they have similar affects, although they can have different causes. The EDR or some of its sensors could malfunction. The EDR could be severely damaged in the crash. The power supply to the EDR could be cut.

Authenticity

AUTHENTICITY deals with the origin and genuineness of data. In EDR issues authenticity has its own set of threats relative to EDR security architecture. EDR data is used as evidence in disputes, and therefore its authenticity must be guaranteed to a degree acceptable by courts. EDRs raise critical issues including: who should have access to the data stored; under what circumstances access should be granted; whether EDRs are tamper-proof; and whether they are resistant to accidental spoliation. Access to EDR data is possible by anyone having physical access to the vehicle interior and plugging an electronic tool into the SAE J1962 connector. The court or any higher authority must be convinced that the data presented to it can be linked unambiguously to an event and a certain vehicle. Authenticity needs to be protected during the data transition from the EDR to the court.

The current design of EDR architecture and data model provides a link between the EDR and the vehicle. However, the EDR itself would not provide a digital signature of any kind to prove that the data originates from the EDR. As the records are not signed by the EDR, everybody in the chain could modify it. Such modifications would be hard to spot if the original record is not integrity-protected. EDR data needs to be lockout sealed at the time of the crash. EDR data can be lockout sealed at the time of the crash by utilizing a vehicle connector lockout. If not lockout sealed at crash time, it is crucial to keep the time window between crash and download of the EDR data as small as possible. Signing the records by the EDR itself cannot be implemented without a significant overhead for a security infrastructure. However, lockout sealing the EDR data at the time of crash is both technically feasible and economically sound. Reliable proof of authenticity of data is enhanced by securing/lockout sealing the DLC. Tampering motor vehicles may be the privacy crime of the future. Cars today are as much products of computer electronics as they are automotive engineering. Because they contain and rely upon so much high-tech circuitry, cars are increasingly becoming vulnerable to computer hackers who may be able to manipulate vital components while in use, according to researchers.

How it Works

Approximately 5½ million crashes will occur in the U.S. in 2012. No two crashes will be exactly the same. The Haddon Matrix is widely used to better understand crashes by segmenting them into pre-crash, crash and post-crash segments. The following example demonstrates how NFC chip(s) embedded in the vehicle connector lockout establishes the chain of custody evidence regarding when the vehicle connector lockout was installed and removed from a motor vehicle.

The following sentences define the concept of "pre-crash", "crash", and "post-crash" modes: Pre-crash is any point in time prior to a crash. Crash is the time a vehicle is disabled in any form or manner. Post-crash is a point in time measured from the crash time.

During pre-crash someone can use an Near Field Communications (NFC) enabled cell phone to TAP/TOUCH the vehicle connector lockout in a specific location that is marked with text or graphic art (i.e JUST TOUCH ME). This TAP/TOUCH opens up a landing page on a mobile cell app and automatically deposits one or more of the following data elements: time, date, location, or unique NFC inlay UIP number. Additional data pre-programmed into the NFC inlay may include one or all of the following: 1) website tag, 2) contact tag, 3) smart poster tag, 4) Google map tag, 5) Twitter tag, 6) Facebook tag, 7) Linkedin tag, 8) Google search tag, 9) Bing tag, or 10) local file tag. The mobile landing page permits additional data entry including 1) timestamp, 2) vehicle ownership, 3) Vehicle Identification Number (VIN), 4) next-of kin contact, 5) insurance information, 6) personal medical information, 7) health care provider and other 8) other vehicle owner/motorist related data.

The vehicle connector lockout is then attached to the vehicle's DLC and, importantly, the specific location of the initial NFC Tap/Touch is then concealed. This area cannot be Tap/Touched again until the vehicle connector lockout is removed.

A second Near Frequency Communications (NFC) embedded inlay located in a specific marked area on the front of the device or in the key for the device is TAP/TOUCHED. This second TAP/TOUCH created in short time duration (seconds, minutes) from the initial TAP/TOUCH establishes a real-time verification of this fact via a cell Near Field Communication (NFC) Tag app. When the app is closed this pre-crash data is then saved in a Cloud evidence vault. The vehicle connector lockout may be removed and re-attached during pre-crash for vehicle inspection, maintenance or emissions check prior to a crash.

Each time it is attached or removed can be verified by utilizing the Near Field Communication (NFC) cell tag app. The tag can point to a URL or a dialer to dial a phone number. At the crash site law enforcement, first responders, insurance adjusters, or others on-site can confirm that the vehicle connector lockout is attached or if the DLC interface port is unsecure.

The post-crash NFC Tag/TOUCH will point to a website where the end user can generate an encrypted verification code citing the NFC Unique Identification code UIP, the vehicle identification number (VIN), the time and date of the crash vs. the time and date of post-crash NFC scan. Usage of Near Field Communication (NFC) embedded inlays or tokens in the vehicle connector lockout permits additional NFC enabled cell app use applications as NFC technology is enhanced.

Subsequently, to verify evidence, a photograph with time and date may be utilized. Additionally, crash data facts may be stored in a non-volatile memory component of the invention (i.e. iBUTTON) to store access data and other data about the vehicle or owner/operator such as next-of-kin, medical, insurance or general contact information.

In the Cloud there would be two types of tags. Each will be encoded different to determine if the tag is for the lock or the key. Thus two product types will be encoded into the database. Lock tags will go to the registration landing page to enter data, which will send an email when saved. The email will include a password that the user will have to enter to change the tag on future taps. The email will also contain a link to be able to access the vault locker report. When someone taps the Lock tag that has been registered, they will have to provide the password to allow them to change anything (i.e. change their email address). If they do not remember the password, they can request it be sent to the registered email address.

Key tags go to a different page that just shows the updated time/date and tells the user that a new email has been sent to the registered owner (email is sent with time, date, etc.) This email could contain the entire data log for the tag.

In addition to the above scenario, if the vehicle DLC is not secure at the time of a crash then this invention provides law enforcement and first responders an opportunity to lockdown (similar in concept to using yellow tape to block-off a crime scene) the DLC post-crash. This will establish that the vehicle DLC is secure thus providing end users with scientific data that has probative value.

Near Field Communication (NFC) is a set of standards for smart-phones and similar devices to establish radio communication with each other by touching them together or bringing them into close proximity, usually no more than a few centimeters. Present and anticipated applications include contactless transactions, data exchange, and simplified setup of more complex communications such as Wi-Fi. Communication is also possible between an NFC device and an unpowered NFC chip, called a "Tag". NFC is a set of short-range wireless technologies, typically requiring a distance of 4 cm or less. NFC operates at 13.56 MHz on ISO/IEC 18000-3 air interface and at rates ranging from 106 kbit/s to 424 kbit/s. NFC always involves an initiator and a target; the initiator actively generates an RF field that can power a passive target. This enables NFC targets to take very simple form factors such as tags, stickers, key fobs, or cards that do not require batteries. NFC peer-to-peer communication is possible, provided both devices are powered. NFC tags contain data and are typically read-only but may be rewriteable. They can be custom-encoded by their manufacturers or use the specifications provided by the NFC Forum, an industry association charged with promoting the technology and setting key standards. The tags can securely store personal data such as debit and credit card information, loyalty program data, PINs and networking contacts, among other information. The NFC Forum defines four types of tags which provide different communication speeds and capabilities in terms of configurability, memory, security, data retention and write endurance. Tags currently offer between 96 and 4,096 bytes of memory.

The Near Field Communication (NFC) Tag provides a solution that offers many useful elements to the invention. NFC Tags can be color or black and white and offer an end-to-end system that provides many capabilities beyond simply opening a URL, and is built upon a highly scalable and flexible architecture. The NFC Tag system uses a cloud-based back-end that provides access to data such as reporting on how frequently and where NFC Tags are being scanned. In addition, NFC tag usage allows one to dynamically change the data source—unlike 2D QR codes that are associated with a single, permanent URL, NFC Tags can be updated as frequently as you like to point to new websites, allowing reuse. NFC Tags can be created in a much smaller size and can be read faster without limitations of lighting conditions. NFC Tags can also be customized to brand's specific look and feel, creating visually exciting codes that enhance message and brand. The NFC cell application runs on major smart phone platforms such a Windows Phone/Mobile, iPhone, BlackBerry, J2ME-Java, Symbian and Android. On a GPS enabled cell a scan location can be determined through the latitude, longitude or postal code, or a combination of all three.

To overcome the shortcomings of the prior art cited above, the present invention provides a vehicle connector lockout with embedded NFC technologies to prevent tampering or altering of digital data stored on an in-vehicle electronic vehicle network that utilizes a DLC interface port and therefore enhancing the security, integrity and authenticity of the data.

Other objectives, advantages and novel features of the invention will become more apparent from the following detailed description when taken in conjunction with the accompanying drawings.

BRIEF DESCRIPTION OF THE DRAWINGS

FIG. 2 is a side view in partial section of the vehicle connector lockout and the DLC interface port in FIG. 1 showing a key or tool.

FIG. 2A shows a front view, 2B a rear view, 2C a top view, 2D a bottom view, 2E a side view, and 2F a stand-up view of the connector shell of the invention.

DETAILED DESCRIPTION OF PREFERRED EMBODIMENT

Figures 1, 1A:
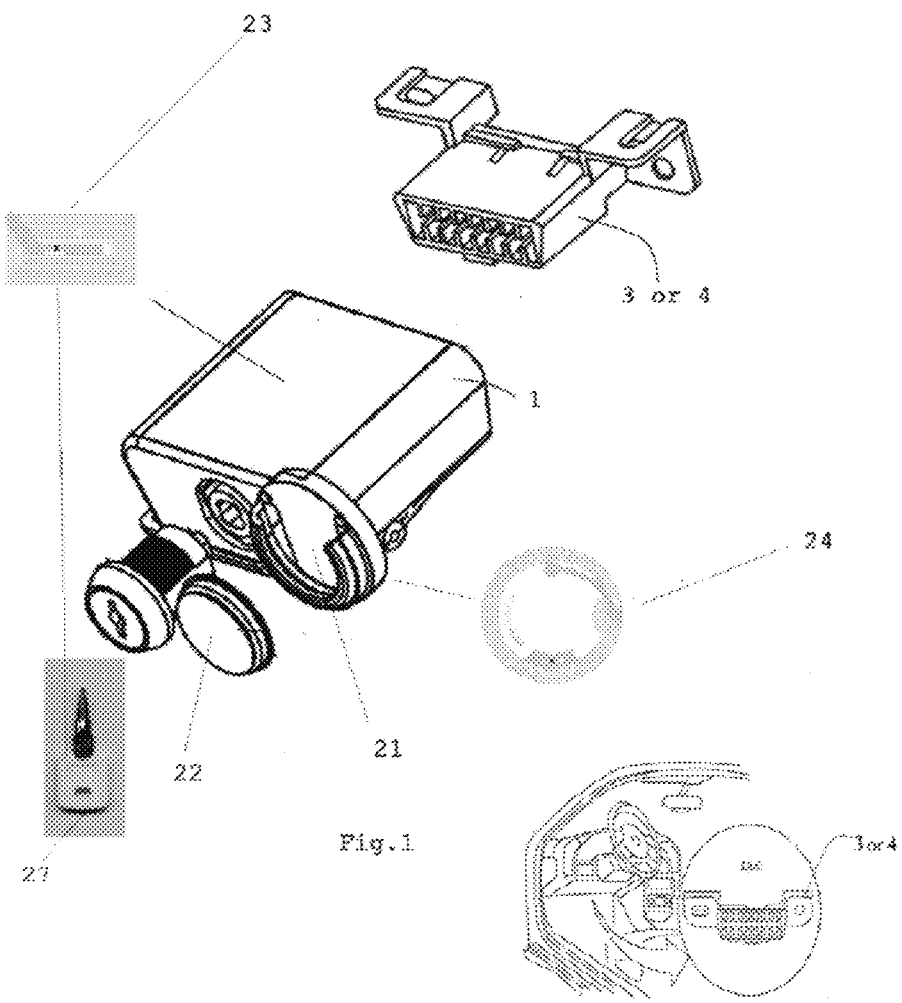
FIG. 1 is a perspective view of a vehicle connector lockout in accordance with the present invention and a vehicle Diagnostic Link Connector (DLC) interface port.
FIG. 1A is a schematic diagram showing typical location of the DLC within the vehicle.
Figure 3:
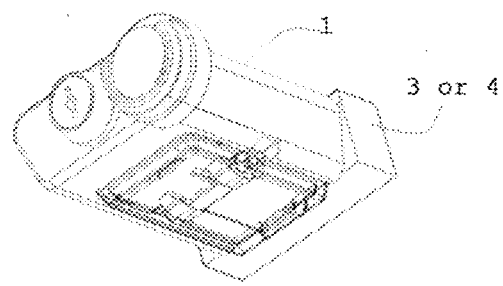
FIG. 3 is a side/bottom view in partial section of the vehicle connector lockout and the DLC interface port in FIG. 1 showing that the connector lockout is plugged into the in-vehicle DLC interface port.

The main objective of the invention is to provide a vehicle connector lockout to prevent tampering or altering of digital data stored on an in-vehicle electronic vehicle network utilizing a diagnostic link connector (DLC) interface port and therefore enhancing the security, integrity and authenticity of the data. The present invention hampers and prevents access to (and thus misuses of) motor vehicle information systems and crash data by providing a means to restrict physical access to the vehicle diagnostic link connector (DLC) interface port, which is located under the vehicle dashboard as illustrated in FIG. 1A.

The figures will be described with respect to reference items named in the following table:

| NUMBERING | |
|---|---|
| 1 | Vehicle connector lockout |
| 2 | In-vehicle electronic network |
| 3 | In-vehicle DLC Type A |
| 4 | In-vehicle DLC Type B |
| 5 | Sidewalls |
| 6 | Cavity |
| 7 | Row one pin socket |
| 8 | Row two pin socket |
| 9 | Pin socket(s) |
| 10 | Cavity |
| 11 | Cavity |
| 12 | Pin slot(s) |
| 13 | Shell case |
| 14 | Removable key or tool |
| 15 | Open front |
| 16 | Rear |
| 17 | Top |
| 18 | Bottom |

-continued

| NUMBERING | |
|---|---|
| 19 | Side |
| 20 | Side |
| 21 | Front faced memory slot |
| 22 | Memory Chip |
| 23 | NFC Token/Tag |
| 24 | NFC Inlay |
| 27 | Key |

Figure 7:
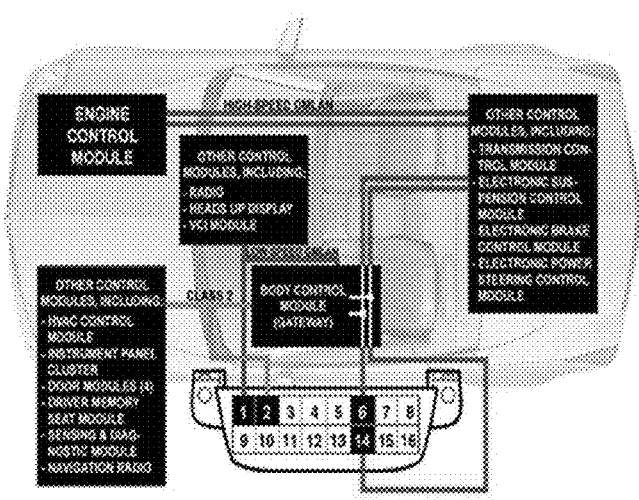
FIG. 7 shows a vehicle Controlled Area Network (CAN).

With reference to FIG. 1 there is shown an overview of a vehicle connector lockout (1) as connected to a DLC (3 or 4) interface port. In accordance with the present invention the vehicle connector lockout (1) is used to discourage tampering and/or spoliation of digital data stored on an in-vehicle electronics network (2) using a DLC (3 or 4) interface port. One example of an in-vehicle electronics network is FIG. 7 Controlled Area Network (CAN) (2).

FIG. 2 is a side view in partial section of the vehicle connector lockout (1) that comprises a shell case (13) and a removable key or tool (14).

FIG. 2A shows a front view, FIG. 2B a rear view, FIG. 2C a top view, FIG. 2D a bottom view, FIG. 2E a side view, and FIG. 2F a stand-up view of the connector shell of the invention.

Figure 4:
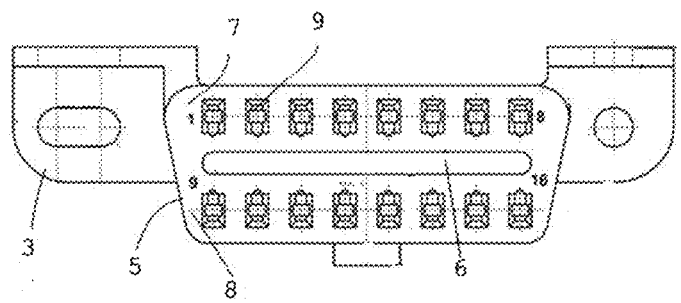
FIG. 4 is a front view of a type "A" DLC connector.
Figure 5:
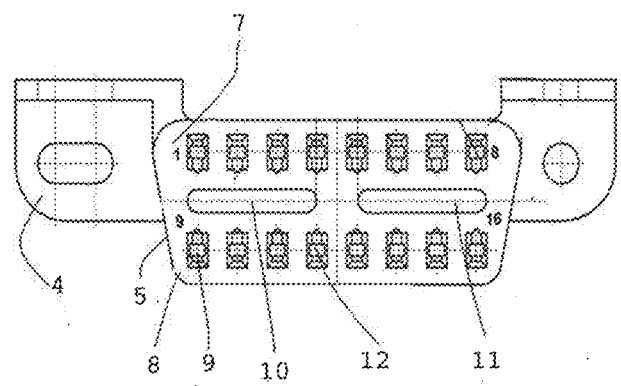
FIG. 5 is a front view of a type "B" DLC connector.
Figure 6:
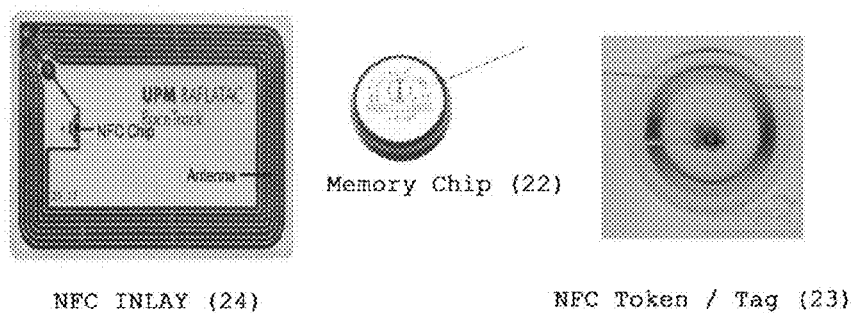
FIG. 6 is a memory module and/or NFC Token/Tag.

There are two types of DLC interface ports (3 or 4). The type "A" DLC (3) interface port in FIG. 4 has two sidewalls (5) one open cavity (6) between two rows (7 and 8) of pin sockets (9). The type "B" DLC (4) in FIG. 5 has two sidewalls (5) and two cavities (10 and 11) formed in-between two rows (7 and 8) of pin sockets (9). Each row includes eight pin slots (12). The type "A" is used with 12 v systems and the type "B" is used with 24 v systems.

The shell case (13) is comprised of an open-front (15) in FIG. 2a, a rear (16), a top (17) a bottom (18), two sides (19 and 20), and a front-face slot (21) to embed a memory chip (22) or NFC chip (23). The key (27) includes an NFC chip (23)

The shell bottom (18) includes an NFC inlay (24) than can be programmed to respond to a NFC enabled mobile cell device to communicate with the Internet.

In summary, the connector lockout (1) with embedded Near Field Communication (NFC) tag(s) (23 and 24) establishes a chain of custody data access record and prevents tampering or altering of digital data stored on an in-vehicle electronic vehicle network enhancing the security, integrity and authenticity of the data.

Even though numerous characteristics and advantages of the present invention have been set forth in the foregoing description, including details of the structure and function of the invention, the disclosure is illustrative only. Changes can be made in detail, especially in matters of shape, size and arrangement of parts within the principle of the invention to the full extent indicated by the broad general meaning of the terms in which the appended claims are expressed.

Each citation or reference in this application is hereby incorporated in its entirety herein by reference.

REFERENCES CITED

[1]. A review of jurisprudence regarding event data recorders: implications for the access and use of data for Transport Canada collision investigation, reconstruction, road safety research, and regulation, prepared for the road safety and motor vehicle regulation, Transport Canada. Mar. 31, 2005

[2]. U.S. Department of Transportation, National Highway Traffic Safety Administration. Final Rule, 49 CFR Part 563, Event Data Recorders, Aug. 21, 2006 and Jan. 14, 2008, Docket No. NHTSA-2008-0004.
[3]. Use of Event Data Recorder (EDR) Technology for Highway Crash Data Analysis, Transportation Research Board NCHRP (Project 17-24), December 2004.
[4]. Vehicle Data Recorders—FMCSA-PSV-06-001, Federal Motor Carrier Safety Administration, December 2005.
[5]. Institute of Electrical and Electronics Engineers (IEEE) global standards for Motor Vehicle Event Data Recorders (MVEDRS); IEEE 1616-2010 and IEEE 1616a-2010, May, 2010.
[6]. GAO-09-56 Report to the Chairman. Committee on Commerce, Science, and Transportation, U.S. Senate: HIGHWAY SAFETY: Foresight Issues Challenge DOT's Efforts to Assess and Respond to New Technology-Based Trends, October 2008.
[7]. Analysis of Event Data Recorder Data for Vehicle Safety Improvement, USDOT/NHTSA DOT HS 810 935.
[8]. National Research Council/National Academies, Committee for a Study of Electronic Vehicle Controls and Unintended Acceleration, Keck Center, 500 Fifth St., NW, Washington, D.C., Presentation: MOTOR VEHICLE 'EDR' GLOBAL STANDARDIZATION AND RELATED ISSUES, Nov. 16, 2010.
[9]. Electronic Privacy Information Center, 1718 Connecticut Ave. N.W. Suite 200, Washington, D.C. 20009 Presentation: MOTOR VEHICLE 'BLACK BOX' USES AND MISUSES, May 28, 2010.
[10]. National Highway Traffic Safety Administration (NHTSA) 1200 New Jersey Avenue, SE, West Building, Washington, D.C. 20590., Presentation: EVENT DATA RECORDER (EDR) STANDARDS, Apr. 28, 2010.
[11.] SCIENTIFIC JOURNAL: Author of the EDR segment in the McGraw Hill 2009 Yearbook of Science & Technology.
[12]. The 21st Annual Conference Computers, Freedom & Privacy: "The Future is Now" Presentation: AUTOMOTIVE BLACK BOX STANDARDS AND "RELATED ISSUES", Georgetown University Law Center, 600 New Jersey Ave NW, Washington, D.C. Jun. 16, 2011.
[13]. CONGRESSIONAL TESTIMONY: U.S. Senate Hearing 111-965 TOYOTA RECALLS AND THE GOVERNMENT'S RESPONSE, Hearing Before the Committee on Commerce, Science and Transportation, United States Senate, One Hundred Eleventh Congress, Second Session, Mar. 2, 2010. Pgs. 13-143, U.S. Government Printing Office, Washington, D.C. printed 2011.
[14]. NATIONAL RESEARCH COUNCIL (U.S.). Committee on Electronic Vehicle Controls and Unintended Acceleration. The safety promise and challenge of automotive electronics: insight from unintended acceleration. Transportation Research Board special report 308, ISBN 978-0-309-22304-1, National Research Council of the National Academies, 2012.

Having thus described my invention, what I claim as new and desire to secure by Letters Patent is as follows:

1. A vehicle connector lockout to secure an in-vehicle Diagnostic Link Connector (DLC) interface port, comprising:
    means for verifying real time vehicle connector lockout usage during pre-crash, crash and post-crash;
    means to embed Near Field Communication (NFC) technologies comprising a first NFC inlay and a second NFC inlay in the vehicle connector lockout;
    wherein said verifying means employs a sealing sequence of tap-touching said first NFC inlay, locking said vehicle connector with a key, followed by tap-touching said second NFC inlay to record information identifying said sealing sequence, and an unsealing sequence of tap-touching said second NFC inlay via said key, unlocking said vehicle connector with said key, and tap-touching said first NFC inlay to record information identifying said unsealing sequence; and
    means to communicate with the Internet to preserve said sealing and unsealing identification information.

2. A vehicle connector lockout, comprising:
    a first NFC inlay embedded in the vehicle connector lockout;
    a second NFC inlay embedded in the vehicle connector lockout;
    wherein the first inlay is configured to be tap-touched prior to attaching the vehicle connector lockout to a diagnostic link connector (DLC) and cannot be tap-touched again until the vehicle connector lockout is removed from the DLC,
    wherein the second inlay is configured to be tap-touched within a limited time after the first inlay is tap-touched, thereby verifying the tap-touching of the first inlay,
    wherein a key is used to lock the connector following tap-touching said first inlay and before tap-touching said second inlay, and
    wherein said key in used to unlock the connector following tap-touching said second inlay and before tap-touching said first inlay.

3. A method of establishing chain of custody of vehicle data stored on the vehicle's Controlled Area Network (CAN) and accessible via a Diagnostic Link Connector (DLC) interface port in the vehicle, comprising:
    sealing the DLC using a vehicle connector lockout configured with first and second NFC inlays by
        tap-touching the first NFC inlay, thereby recording information identifying the first NFC inlay and the date and time of the tap-touching at sealing;
        locking the vehicle connector lockout to the DLC with a key; and
        tap-touching the second NFC inlay via the key, thereby recording information confirming the first tap-touching;
    at a later time, observing the sealed status of the DLC; unsealing the DLC by
        tap-touching the second NFC inlay via the key;
        unlocking the vehicle connector lockout from the DLC with the key; and
        tap-touching the first NFC inlay, thereby recording information identifying the first NFC inlay and the date and time of the tap-touching at unsealing; and
    preserving, as proof of chain of custody of vehicle information extracted after said unlocking, a data log of said information recorded at sealing and said information recorded at unsealing.

4. A method as in claim 3, wherein the tap-touching at sealing is done with an NFC enabled cell device.

5. A method as in claim 4, wherein said information recorded at sealing is recorded in an application on said NFC enabled cell device.

6. A method as in claim 5, wherein said information recorded at sealing is transferred via an Internet connection to a URL landing page of said NFC cell application.

7. A method as in claim 6, wherein said information recorded at sealing is saved to a cloud vault.

8. A method as in claim 5, wherein said NFC cell application is used to record a Vehicle Identification Number (VIN) of the vehicle, a license number and state of the vehicle, and a key code of the lock used for locking and unlocking the vehicle connector lockout device.

* * * * *